H. V. WELCH.
PROCESS AND APPARATUS FOR RECOVERING SOLUBLE CONSTITUENTS FROM FURNACE FUMES.
APPLICATION FILED AUG. 11, 1917. RENEWED MAY 2, 1921.
1,382,037.
Patented June 21, 1921.
2 SHEETS—SHEET 1.
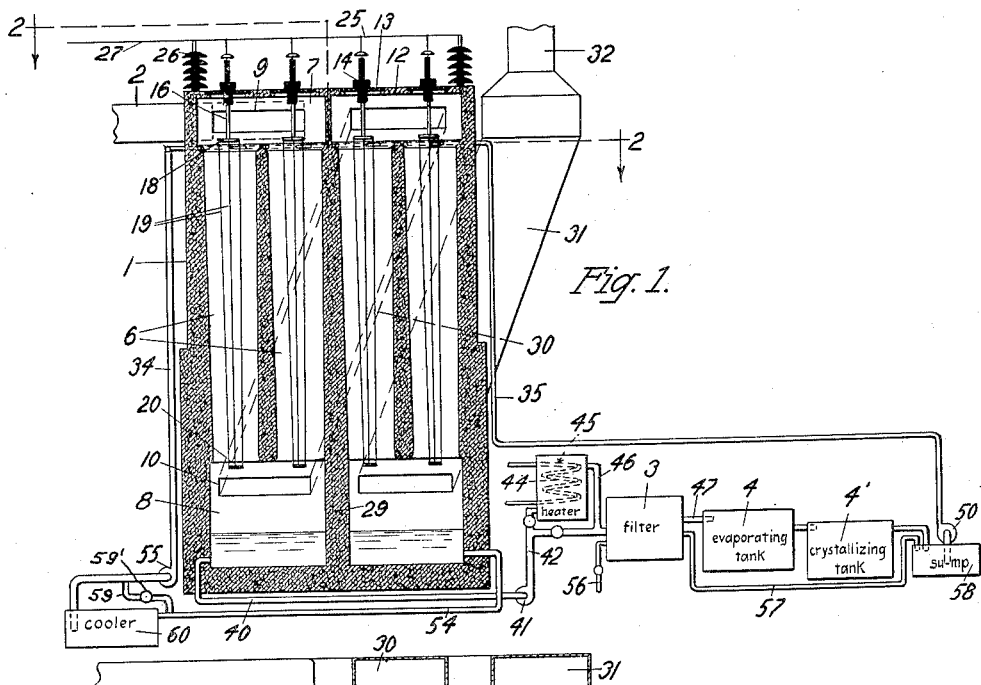
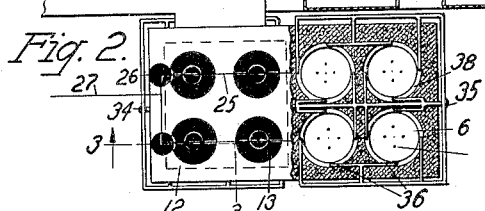
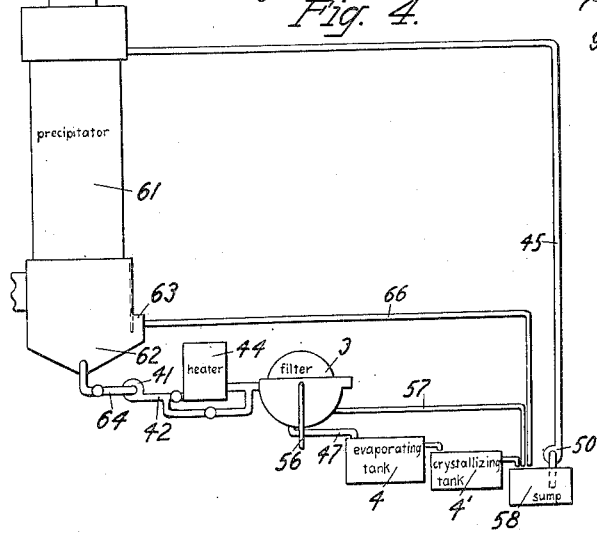
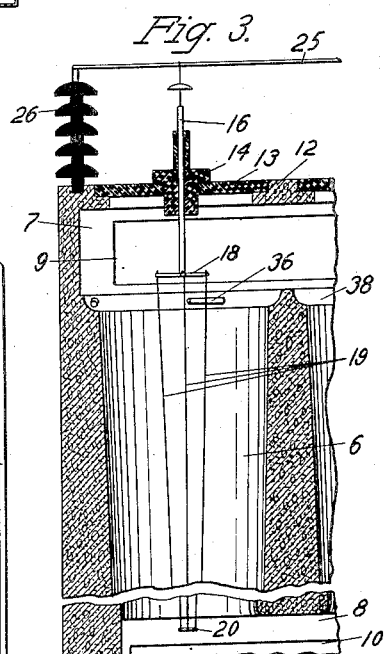
*Inventor:*
Harry V. Welch
by Arthur P. Knight
his Attorney.

H. V. WELCH.
PROCESS AND APPARATUS FOR RECOVERING SOLUBLE CONSTITUENTS FROM FURNACE FUMES.
APPLICATION FILED AUG. 11, 1917. RENEWED MAY 2, 1921.
1,382,037.
Patented June 21, 1921.
2 SHEETS—SHEET 2.
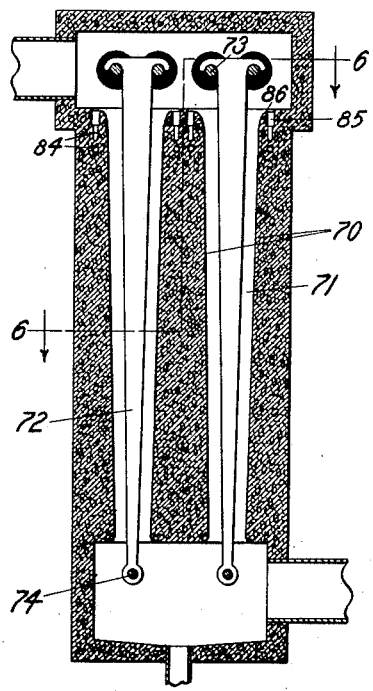
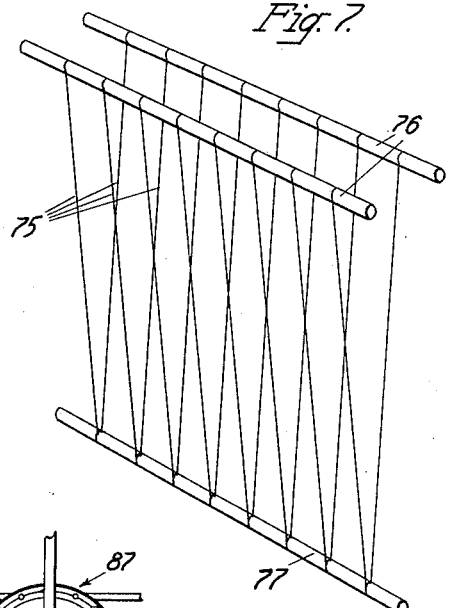
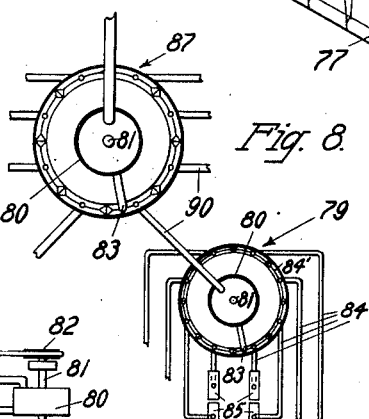
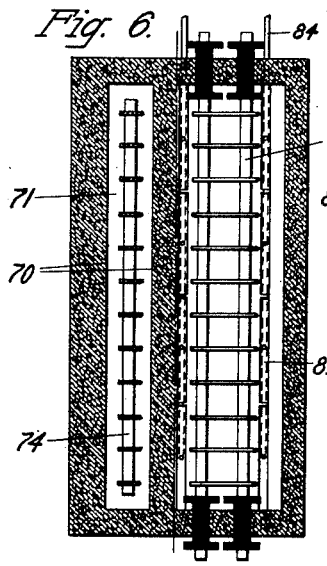
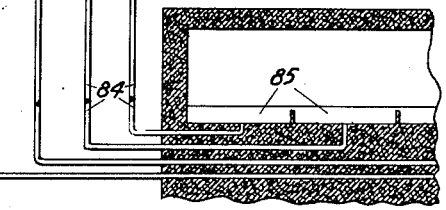
Inventor:
Harry V. Welch.
by: Arthur P. Knight
his Attorney.

UNITED STATES PATENT OFFICE.

HARRY V. WELCH, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

PROCESS AND APPARATUS FOR RECOVERING SOLUBLE CONSTITUENTS FROM FURNACE-FUMES.

1,382,037.     Specification of Letters Patent.     Patented June 21, 1921.

Application filed August 11, 1917, Serial No. 185,779. Renewed May 2, 1921. Serial No. 466,218.

*To all whom it may concern:*

Be it known that I, HARRY V. WELCH, a citizen of the United States, residing at Los Angeles, in the county of Los Angeles and State of California, have invented a new and useful Process and Apparatus for Recovering Soluble Constituents from Furnace-Fumes, of which the following is a specification.

This invention relates particularly to the recovery of potassium compound from waste furnace gases, but is also applicable, in a general way, to recovery of other water soluble materials contained in fume or dust in hot gases.

In the industrial arts, there are numerous instances where the feed furnaces and combustion chambers contains a certain percentage of potassiferous constituent. In practice, it has been found that this potassiferous constituent, under proper furnace conditions, is very largely volatilized, and as a fume, can be obtained as a very concentrated product in the solids emitted from furnace gas exits. As examples of such conditions, I may mention the gaseous discharges from cement kilns, where the solids caught in gas passing through the outlet pipe, may contain from 5 to 40% potassium compound, while the original feed to kiln contains usually under 1% potassium compound. Other industrial plants, showing large potassiferous fume or dust discharges in waste furnace gases, which may here be mentioned, are blast furnaces, sugar mills burning pressed sugar cane stock under boilers, plants incinerating kelp, tobacco stems, etc. My invention is applicable for the recovery of potassium compound in any of such cases.

In cement plants, the fume or dust containing potassium compound has been collected by electrical precipitation in treaters wherein the gas is subjected to the action of an electrical field, and the types of treaters which have been used, comprise collecting electrodes formed as pipes or plates, discharge electrodes formed as wires—for example, and means for maintaining said electrodes at high potential difference, so as to cause precipitation of the material mainly on the collecting electrodes. Since the removal of the solids was formerly the main desideratum, and since this was to be accomplished with as little interference as possible with operating conditions, it has been usually the practice to remove these in the dry state. Thus, the operation of each section of the treater plant was intermittent in character, due to the necessity of removing at regular intervals of time, the dust collected upon the treater pipes or plates. It has been found that the gradual accumulation of dust and fume upon the collecting walls, tends to promote unfavorable electrical conditions, and these result in incomplete removal of the solids from the gases passing through treater. To secure maximum efficiency, commercially, it has become common practice to decrease the velocity through the treater, to minimum consistent with economical construction, and to provide by rapping and hammering devices, upon all parts of the treater subjected to high potential, frequent and vigorous action, to completely loosen and remove the accumulated solids.

It has been proposed to supply water to the inside surfaces of the treater flues, in order to continually carry away deposited material and maintain smooth electrode surfaces. This overcomes some of the difficulties above noted, and also provides for continual solution of solubles in the fume, concurrently with the collection of the fume. The present invention provides for carrying out such a mode of operation in the most economical and effective manner.

An important object of the invention is to provide for utilizing the water or liquid used for carrying off the deposit, in a cyclic manner, so as to obtain more effective recovery of the solubles and to economize in the use of water.

Another object of the invention is to utilize the waste heat of the furnace gases in heating the water, to the most suitable temperature for solution of the desired solubles, and for evaporation of the solution to concentrate the same, for recovery of the solubles therefrom.

In this connection, my invention also provides for limiting the amount of heat withdrawn from the gases by the liquid, so as, on the one hand, to prevent undue evaporation of the liquid such as would result in insufficient flushing of the collecting electrode surfaces, and on the other hand, to prevent undue cooling of the gases, particularly in cases where natural draft is used.

A further object of the invention is to utilize reagents present in the furnace gases, for controlling the solution of the contents of the fume. For example, in the case of cement kiln gases, my invention provides for utilizing carbon dioxid present therein, to reduce the solubility of the calcareous constituent of the fume or dust.

The accompanying drawings illustrate an apparatus suitable for carrying out my invention, and referring thereto,—

Figure 1 is a partly sectional elevation of such apparatus.

Fig. 2 is a section on line 2—2 in Fig. 1.

Fig. 3 is a section on line 3—3 in Fig. 2.

Fig. 4 is a flow sheet of a modification of the apparatus.

Fig. 5 is a vertical section of a modified form of electrical precipitator, embodying my invention.

Fig. 6 is a section on line 6—6 in Fig. 5.

Fig. 7 is a perspective of another form of discharge electrode.

Fig. 8 is a plan view of distributing means for the liquid and

Fig. 9 is a vertical section thereof.

The apparatus shown in the drawings comprises an electrical precipitator or treater indicated at 1, adapted to receive the gases to be treated from a furnace flue 2, and provided with means for supplying water or other liquid for dissolving the solubles from the precipitated material, a filtering means indicated at 3 for removing the solid matter from the resulting solution, means such as evaporating or crystallizing tanks 4 and 4' for separating the potassium salt or other desired product from the solution, and suitable pipe and pump means for conducting the liquid in a closed cycle through the described apparatus.

The electrical precipitator shown in the drawing is of a type particularly adapted for use with cement kiln fume or other fumes which have no injurious corrosive effect on cement or concrete. Said precipitator comprises a structure built up of concrete, preferably reinforced and monolithic, and having the various passages or flues for gases formed therein, said passages or flues including vertical flues 6, opening at their upper ends into header chambers 7, and at their lower ends into lower header chambers 8, said header chambers 7 and 8 being formed in the concrete structure, and being provided with lateral openings 9 and 10, constituting respectively, inlets and outlets for the gases. The vertical flues 6 are preferably tapered from their upper toward their lower ends, for the purposes hereinafter set forth. The bottom portion of each lower header chamber 8 forms a sump or reservoir for receiving the collected material.

The upper header 7 may be closed at the top thereof by reinforced concrete top member 12, which may be provided with circular openings to receive the insulating supports for the discharge electrodes, which are mounted in such manner as to extend vertically and axially in the respective flues 6. Each of said insulating supports may comprise a slab or disk 13 and a bushing 14, mounted centrally in said disk, said disk and bushing being, for example, of serpentine or other suitable insulating material, and said bushing having a central bore for passage of the conductor 16 leading to the discharge electrode.

Each discharge electrode is preferably of the form shown, comprising an upper plate or spider 18, from which hang any desired number of electrode members formed, for example, as wires 19, connected at their lower ends by a member 20, said electrode wires being preferably mounted so as to converge toward their lower ends, and so that each electrode wire will extend parallel to the adjacent surface bushing of the electrode flue 6. By sufficiently weighting the lower end of the plurality of spaced apart electrode wires a stable or non-vibrating structure is obtained, the convergence of the electrode wires preventing swaying or pendulum movement thereof so that any support or retaining means for the lower ends of the electrodes, is not necessary, the electrodes being supported wholly from their upper ends. The upper member 18 on which these electrode wires are hung is connected to a rigid rod 16 extending through the insulating bushing 14 aforesaid, and connected at its upper end to high tension current supply wire 25, which is mounted on insulators 26, and is connected by a wire 27 to any suitable source of high tension current, preferably unidirectional—for example, in the manner set forth in the patent to F. G. Cottrell, No. 895,729—dated August 11, 1908. The concrete structure of the treater may be provided with one or more vertical partition walls 29 so as to separate the upper and lower headers in such manner as to form, in effect, a plurality of treaters adapted to receive the gases in series. The gases may be caused to pass either upwardly or downwardly through the flues 6. In case down-flow of the gases is preferred, as would generally be the case, the flue 2, leading from the furnace, is connected to the inlet opening 9 for one of the headers 7, and the outlet opening 10 for the corresponding lower header 8 is connected by a flue 30 to the inlet opening 9 for the upper header 7, for the next succeeding set of flues. In this case, only two sets of flues are shown, the outlet 10 of the lower header 8 of the second set of flues being connected directly by outlet flue 31 to stack 32. If desired, however, one or more additional sets of flues may be provided, connected in similar manner to that above described, and if necessary, suitable blowing or forced draft means may be provided for forcing the gases through the flues, in case natural draft is not sufficient for that purpose.

Suitable means are provided for supplying water to the several treater flues 6. For this purpose, supply pipes 34 and 35, for the respective first and second sets of flues, are connected to outlet pipes or nozzles 36, discharging water into the upper portions of the respective flues, preferably in a tangential direction, said flues being preferably provided with shelves or troughs 38 at their upper portions against which the water is directed so as to cause the water to be more uniformly and effectively distributed onto the surfaces of the flues. The water running down the surfaces of the flues 6 collects in the respective sumps at the lower portions of the headers 8, and is withdrawn or pumped off in the manner hereinafter described, together with the collected material.

From the lower header 8, for the first set of treater flues, an outlet pipe 40 leads to pump 41, which forces the liquid through a pipe 42, either directly to the filter 3 or, if desired, to a heater 44, provided with a steam coil 45, or other means, for heating the liquid so as to increase the solubility of certain constituents thereof, if desired, said heater 44 being connected in such case, by a pipe 46, to the filter 3. Said filter may be of any suitable type—for example, a continuously operating rotary filter, adapted to continuously receive the liquid containing suspended material, and to continuously deliver the filtrate through an outlet pipe 47. Said outlet pipe discharges into a suitable evaporating or crystallizing means, such as tanks 4 and 4', which are adapted for treatment of the liquid by evaporation, or by cooling, or both, in such manner as to separate the desired salts therefrom. Suitable means, such as pump 50, is provided for drawing off the residual liquor from a sump 58 receiving such liquor from the last tank 4', and for forcing it through pipe 35 to the water supply nozzle 36 of the flues of the second set. Outlet pipe 54, leads from the lower portion of the lower header 8 for this second set of treater flues to a cooler 60, from which a pump 55 forces the liquid through pipe 34 to the water supply nozzle for the first set of treater flues. A by-pass 59 having a valve 59' may be provided for the cooler 60. Filter 3 may be provided with supply pipe 56 for wash water, the washings passing through pipe 57 to sump 58.

My process may be carried out in the above described apparatus, as follows:

The hot gases coming, for example, from a cement kiln or kilns, and carrying dust and fume containing potassium compound as a constituent, are conducted through flue 2 to the upper header 7 of the first set of treater flues and passed downwardly through said treater flues into the lower header 8 and then up through the connecting flue 30 and down through the treater flues of the second set, in which they are discharged through flue 31 to the outlet 32. In passing down through the flues 6, the gases are subjected to the action of an electrical field produced between the discharge electrodes 19 and the inside surfaces of the flues 6, said surfaces being kept wet or flushed by currents or streams of water flowing thereover from the nozzles 36 and the body or sheet of water flowing in this manner on the inside surfaces of the flues 6, being connected to ground through the body of the treater structure and the pipes which supply the water, and the discharge electrodes 19 being connected to the high tension electric supply conductor 27, whereby high tension current, either direct or alternating, is supplied thereto, for maintaining a sufficiently high potential difference between said discharge electrodes, and the flues 6 constituting the collecting electrodes. The effect of the electrical field produced as above described is to cause precipitation of suspended matter, including dust or fumes in the gases, on the body or sheet of liquid flowing down the walls of the flues, this precipitating action being especially effective when the electrodes are charged by a substantially unidirectional current produced, for example, in the manner set forth in the patent of F. G. Cottrell above referred to. By maintaining a continuously flowing stream of water on the inside of each treater flue, accumulation of any solid material on the walls of such flue is prevented, and a substantially smooth surface free from projections tending to develop discharge from the collecting electrodes, is maintained irrespective of the nature of the material being precipitated. This is of especial advantage in precipitating dust or fume, such as cement kiln fume, containing a comparatively high proportion of potassium compound, which would otherwise tend to form a poorly conducting deposit, interfering seriously with precipitation. By thus maintaining the collecting electrodes in condition of maximum effectiveness, I am enabled to largely increase the velocity of the precipitating action and correspondingly increase the rate of flow of gas through the aparatus, with the result that the dust precipitating capacity of a plant of given size is largely increased. I prefer to take advantage of this efficiency of precipitation in making the treater flues larger than is usually the case, said flues, for example, being two or three feet in diameter, as against one foot or less in usual practice. With such a construction, and with the form of discharge electrodes above described, the gap or distance between the discharge electrode and the surface of the collecting electrode may, according to my invention, be increased to say twelve inches, the operating voltage being correspondingly raised so as to maintain the strength of field as near as practicable to the break-down potential difference—that is to say, the highest potential difference which it is possible to maintain in the apparatus without arcing or sparking between the electrodes to any undesirable extent. The use of such comparatively large treater flues is of advantage, not only in reducing the cost of installation for a given cross-sectional area and gas flow capacity, but also in maintaining within desirable limits, the amount of surface of liquid exposed to the hot gases passing through the treater, and thereby avoiding undue consumption of water and undue lowering of temperature of the gases. The amount of surface exposed by the treater flues of the gases should, however, be sufficient to attain the main object of this process in heating the water by the heat of the gases, and thereby reducing the temperature of the gas to a point at which all of the potassium content or other desired volatile soluble will be condensed in the form of fume and precipitated, such heating of the water flowing through the treater flues being also sufficient to maintain the water in a portion at least of the treater flues at a comparatively high temperature—say, approximately 100° C., such high temperature being best adapted for solution of potassium compound present in the precipitated material. The material collected in the treater flues of the second set and washed down in the lower header 8 thereof, is pumped along with the water through pipe 54, pump 55 and pipe 34, to the upper part of the treater flues of the first set, and the water and material contained therein, in passing down the said treater flues of the first set, receives a further amount of precipitated material, which is precipitated directly on the surface of the water and carried down therewith into the lower header 8 for said first set, and this operation may be repeated in as many treater flue sets as may be necessary to bring the concentration of potassium compound in the solution to the point desired. The material consisting of a solution of potassium compound and other salts, together with suspended material, is pumped from the last lower header through pipe 40, pump 41 and pipe 42 to the heater 44, wherein it may be subjected to heat at a sufficient temperature and for a sufficient time to convert into soluble form, any of the potassium compound which has not been dissolved in passing through the treater flues. The solution then flows through pipe 46 to filter 3, wherein the suspended material is removed, the clear filtrate running through pipe 47 to the crystallizing tanks 4, wherein the solution is treated by cooling, evaporation or otherwise, in order to separate out the desired potassium salt. The residual liquid is then pumped by pump 50 through pipe 35 to nozzles 36 in the upper part of the second set of treater flues, thus completing a cycle of operation. Or if desired, all of the filtered solution may be evaporated to dryness for recovery of the solids therefrom, and only the wash water returned to the leaching stage of the process.

As shown in Fig. 4, I may provide for decanting off a part of the liquid coming from the precipitator, before filtering, the precipitator, indicated at 61, being provided, for example, with a receiving tank 62 at the bottom of the lower header thereof, said tank having an overflow chamber 63 at its upper part, for clear liquor, and having a draw-off pipe 64 at its bottom for sediment, said pipe 64 leading to the pump 41 which is connected to the heater 44 as above described. In this case, it is possible to bring the solution to saturation under the conditions of operation so that more or less potassium salt or other salt desired may be separated in the tank 62, by reason of the cooling of the liquid therein. The main leaching cycle is through the precipitator 61, then from the overflow chamber 63 through pipe 66 to sump 58, and thence through pump 50 and pipe 45 back to the upper part of the precipitator. The sediment settling in the bottom part of tank 62 is drawn off together with more or less liquid, and including any salt that may have settled out, through pipe 64 to pump 41, and in passing through the heater 44 the salt that may have settled out is redissolved by the action of heat, aided, if necessary, by agitation. Suitable mechanical means may be provided for forcibly withdrawing the pulp from the bottom of tank 62, in case it is too thick to flow readily. In place of the decantation tank shown, any suitable thickener may be used. The precipitator indicated in Fig. 4 may be made in one or more sections, through which the gas and the washing liquid are passed in series in counter current streams, as described in connection with Fig. 1.

The thickened pulp drawn from the lower part of the decantation chamber, or obtained from the material collecting at the bottom of the precipitator, by use of a suitable thickener, may be passed to a suitable digester or reaction chamber for treatment, for the purpose of increasing the solubility of potassium compound therein, the pulp being subjected in such chamber, to the action of steam or hot water, preferably at a temperature above 100° C., or being subjected to the action of an acid or other agent for increasing the solubility of said compound. Also, the residue, after filtering out potassium compound solution, may be treated in similar manner. In either case, the material from such treatment may be dried and sold for its potassium compound content, or it may be filtered to recover the dissolved potassium salt, and the residue may, if desired, be returned to the feed of the cement kiln, for example.

In some cases, in the production of Portland cement with a view to recovery of potassium salt as a by-product, it is found desirable to use sodium chlorid in the raw mix, for assisting volatilization of potassium compound in the heat treatment in the kiln, and also, in some cases, for increasing the solubility of the potassium compound in the material precipitated from the kiln gases. In such cases, the potassium will be present largely in the form of chlorid and the process may be so carried out that the liquid, at moderate temperature—say 75° C., is circulated through the precipitator until it is saturated with potassium chlorid, and it may then be filtered and the filtrate cooled to cause separation of potassium chlorid. Or, the liquid may be filtered before it is saturated with potassium chlorid and the filtrate then evaporated to saturation of such salt, and cooled to separate potassium chlorid. In either case, the residual solid material resulting from filtration, may be returned to the raw mix, so as to restore to the cycle, any sodium chlorid, and any potassium compound present therein; and the residual liquor from which potassium chlorid has been crystallized out, may be returned to the raw mix feed or to the fuel feed for the kiln, so as to restore a further residual portion of sodium chlorid and of potassium compound, to the cycle. By these operations, the quantity of sodium needed for carrying out the process is reduced to a minimum, and maximum recovery of potassium compound is eventually obtained.

The process above described is applicable, in some of its features to the recovery of other water solubles from furnace gases— for example, it may be applied to the recovery of zinc salts or zinc from zinc furnaces, the zinc being removed from the resulting solution by electrolysis, for example, and the barren solution returned to the leaching stage of the cycle, as set forth in an application filed by me of even date herewith.

The electrical precipitator may be made of the plate type, as shown in Figs. 5 and 6, the body of the treater being, for example, of concrete molded to form vertical upwardly tapering walls 70 so as to form flues 71 which are downwardly tapering, and the discharge electrodes being hung in these flues and consisting of wires strung in downwardly tapering groups as above explained, or of vertical plates 72 placed transversely in the flues, and having downwardly converging edges which are parallel to the walls of flues 71, said plates being mounted on insulated supports 73 in any suitable manner, and provided with spacing means 74, or as shown in Fig. 7, the discharge electrodes may consist of two rows of wires 75 extending in two downwardly convergent planes, said wires being hung from insulated supports 76 at their upper ends and connected to suitable tensioning and spacing means 77 at their lower ends.

The construction of the treater or precipitator of concrete is of advantage on account of cheapness of construction, and on account of durability, especially in cases where the gases being treated are liable to corrode metallic structures. The liquid supplied to the treater distributes more uniformly over the concrete surface than over a smooth surface, and thus is less liable to run in ridges. The inclination of the walls of the flues also aids in the distribution of the liquid.

Instead of the apparatus shown in the drawing, any other suitable apparatus may be used for carrying out my process herein described. For example, the electrical precipitator shown in application of H. A. Burns, Ser. No. 832,892, filed April 18, 1914, may be used for the precipitation of the fume into the body of circulating liquid, and the various filtering and pumping and other devices used in carrying out the process may be of any suitable type, and may be made of any suitable material—for example, in case the substances being treated are of a corrosive nature, the said apparatus, including the electrical precipitator, may be made of, or lined with a comparatively non-corrodible material such as metal, tile, etc.

The liquid may be circulated through the precipitator as a whole, without removal of any of the suspended or dissolved constituents thereof, or it may be treated for separation of any part of such solid constituents before returning to the precipitator. In any case, each circulation of the liquid through the precipitator causes it to take up an additional portion of the desired soluble. Removal of such soluble from the liquid may be effected by treatment of the whole body of liquid at each circulation, or by treatment of only a portion of such body, such portion being drawn off continuously or intermittently and the remainder of the liquid body being returned to the circulation, together with sufficient fresh liquid to make up for the loss by such withdrawal. The portion so withdrawn may consist of part or all of the pulp remaining as a residue on filtration or decantation, or part or all of the filtrate or clear liquor. The treatment for recovery of the soluble from the portion so withdrawn may be by evaporation or cooling or both evaporation and cooling, so as to separate the desired salt by crystallization, or it may be by evaporation of the solution to dryness, so as to recover all the entire solid contents thereof. Thus, if desired, a part of the circulating body of liquid may be drawn off, continuously or intermittently, and may be evaporated to dryness for recovery of all the fume contents precipitated into the portion of liquid so drawn off, the main body of liquid recirculating through the precipitator and fresh liquid being supplied to said body to make up for that lost in such evaporation. The circulating body of liquid may be subjected to filtration or decantation either before or after such withdrawal of the portion to be treated for removal of its solid contents, and in either case, the portion so withdrawn may be subjected to filtration, if necessary, to remove suspended material before recovery of the dissolved material by evaporation or cooling, and crystallization or by evaporation to dryness. Or, in some cases, the fume contents may be of sufficient value, as a whole, to enable them to be recovered without any filtration, the portion of the liquid withdrawn from the circulation being evaporated to dryness, more or less completely, so that the final product contains the insoluble as well as the soluble part of the fume.

In order to insure uniform distribution of the liquid over the surfaces of the electrodes, I prefer to provide distributing means 79, comprising, for example, a tank 80 mounted to rotate on a spindle 81 and driven by pulley 82 or other means, so as to cause a nozzle or outlet means 83 connected to said tank to travel over, and discharge liquid into, an annular series of receptacles 84', communicating with ducts 84 leading respectively to pockets 85 at the upper ends of the electrode walls 70, each pocket 85 having a lip 86 over which the liquid supplied thereto may overflow on to the surface of the electrode. In general, a large number of precipitator units will be provided, and a distributor 87 will be arranged to supply the liquid in uniform charges successively to the respective precipitator units; said distributer 87 being similar in construction to the distributer 79 above described, and ᴗɦe distributing ducts 90 thereof leading to the respective distributers 79, so that the liquid is uniformly distributed by distributer 87 to the distributers 79 for the different units or sections of units, and the distributers 79 supply the liquid uniformly throughout each unit or section. Similar distributing means may be provided for precipitators such as shown in Figs. 1 to 3.

In carrying out the process in any of the apparatus above described, it may, in some cases, be necessary to cool the liquid during its circulation, to prevent undue loss of liquid by evaporation, owing to absorption of heat from the gases in the precipitator. Such cooling may be effected, for example in a cooler such as indicated at 60 in Fig. 1, or in the sump 58 in the form shown in Fig. 4. Said cooler 60 may also serve as a settling tank for removal of solid suspended material, which may be removed from said cooler in any suitable manner, the comparatively clear liquor being pumped to the succeeding leaching stage. The cooler 60, shown in Fig. 1, may also be used to effect the cooling action required for producing an accumulation of precipitated potassium compound in the sludge, as above set forth, so as to increase the amount of potassium compound that can be taken up from the gases with a given amount of water, and the resulting sludge, with its accumulated load of potassium compound, both dissolved and undissolved, can then be passed to the heater 44, shown in Fig. 1, to heat the same sufficiently to bring all the potassium compound into dissolved condition.

The additional liquor required to make up for losses in leaching and in filtration may be supplied at any stage of the process; but is preferably supplied as wash water for the filtering operation.

In addition to causing precipitation of the fume into the liquid, the electrical field developed in the precipitator has several other advantageous functions; one of which is the production of electrical convection or windage, which brings the fume particles into more effective contact with the liquid, and another is the lowering of the surface tension of the liquid, enabling the particles to more readily enter the liquid and to be subjected to chemical or other action thereof. In this connection, it may be stated that the fume particles are in some cases of almost molecular fineness, and are not in general able to penetrate the surface of a liquid of strong surface tension such as water, and on the other hand, the fineness of these particles makes them especially suitable for action thereon when they have been forced into the liquid; so that the process is of especial advantage as applied to such fumes.

Inasmuch as the gas is cooled more or less in its passage through the electrical precipitator, and in general, the conductivity of the gas varies inversely with the temperature, while the dielectric strength of the gas increases as the gas becomes cooler, it may, in some cases, be desirable to vary the spacing of the discharge electrode from the receiving electrode. Thus, in case the gas flows downwardly through the precipitator, as in the apparatus shown in the drawing, the opposing electrodes may be more widely spaced at their upper ends, whereas, if the apparatus is arranged for upward flow of the gas, the electrodes may be spaced more widely at their lower ends, the discharge electrode being, in that case, arranged to converge more rapidly toward their lower ends than the receiving electrodes.

What I claim is:

1. Apparatus for recovering water solubles from dust or fume in hot furnace gases comprising an electrical precipitator provided with discharge and collecting electrodes, means for supplying liquid to said collecting electrodes, means for removing suspended material from said liquid after it has passed over said collecting electrodes, means for removing soluble material from the resulting liquid, and means for returning the residual liquid to the liquid supplying means for said collecting electrodes.

2. An apparatus for recovering water solubles from dust or fume in hot furnace gases, comprising an electrical precipitator provided with discharge and collecting electrodes, means for supplying liquid to said collecting electrodes, means for heating said liquid after it has passed over said collecting electrodes, means for removing suspended material from said liquid after it has passed through said heating means, means for removing soluble material from the resulting liquid, and means for returning the residual liquid to said liquid supplying means for said collecting electrodes.

3. An apparatus for recovering water solubles from dust or fume in hot furnace gases, comprising a plurality of electrical precipitators provided with discharge and collecting electrodes, said precipitators being connected so as to provide for succesisve passage of said hot gases therethrough, means for supplying liquid to the collecting electrodes in each of said precipitators, means for conducting the liquid which has passed over the collecting electrodes of any precipitator to the liquid supplying means for the next preceding precipitator in the gas stream so as to maintain an absorbing liquid cycle in an opposite direction to the gas stream, means for removing suspended material from said liquid after it has passed through the last precipitator of the liquid cycle, means for removing soluble material from the resulting liquid, and means for returning the residual liquid to the liquid supplying means for the first precipitator of the liquid cycle.

4. An apparatus for removing water solubles from dust or fume in hot furnace gases, comprising a plurality of electrical precipitators provided with discharge and collecting electrodes, said precipitators being connected in series so as to maintain a gas stream therethrough, means for supplying liquid to the collecting electrodes in each of said precipitators, means for cooling such liquid after it has passed over the collecting electrodes of any precipitator, means for conducting the liquid from said cooling means to the liquid supplying means for the next preceding precipitator in the gas stream so as to maintain an absorbing liquid cycle in an opposite direction to said gas stream, means for removing suspended material from said liquid after it has passed through the last precipitator of the liquid cycle, means for removing soluble material from the resulting liquid, and means for returning the residual liquid to the liquid supplying means for the first precipitator of the liquid cycle.

5. The process of obtaining potassium compound from the suspended matter of cement kiln flue gases, which consists in treating said material with water in such manner as to produce a saturated solution, then heating the resulting sludge to cause solution of insoluble potassium compound therein, and separating the resulting solution from the remaining insolubles.

6. The process of obtaining potassium compound from suspended material of cement kiln flue gases, which consists in bringing such gases while still hot into contact with water to produce a sludge containing a hot saturated solution, cooling the sludge and solution contained therein to cause separation of a compound containing potassium, returning the remaining solution to act on the said material, and subjecting the sludge containing insoluble material to the action of heat to dissolve potassium compound therefrom, and separating the resulting solution from the insolubles.

7. The process of obtaining potassium compound from suspended material of cement kiln flue gases, which consists in circulating leaching liquid in contact with said gases and suspended material, so as to produce a solution of potassium compound and a sludge containing potassium compound, said solution being used as such leaching liquid—then subjecting said sludge to heat to dissolve potassium compound therefrom, and separating the resulting solution from the insolubles therein.

8. The process of recovering potassium compound from fume in hot furnace gases which consists in electrically precipitating the fume into a flowing liquid, consisting of a solution of potassium compound having suspended material therein, passing the gases into a second precipitator and electrically precipitating residual fumes into a flowing liquid, collecting the resulting liquor and suspended material and using it as the first mentioned flowing liquid, collecting the liquor containing suspended material from the first precipitation, and treating it to separate insoluble material therefrom and to recover the potassium compounds therefrom.

In testimony whereof I have hereunto set my hand, at Los Angeles, California, this 3rd day of August, 1917.

HARRY V. WELCH.